July 25, 1961 R. E. KRUEGER 2,993,713
SEALING ASSEMBLY
Filed April 11, 1958

INVENTOR.
RUDOLPH E. KRUEGER
BY Christie, Parker & Hale
ATTORNEYS

United States Patent Office 2,993,713
Patented July 25, 1961

2,993,713
SEALING ASSEMBLY
Rudolph E. Krueger, 2446 N. Orchard Drive,
Burbank, Calif.
Filed Apr. 11, 1958, Ser. No. 727,993
7 Claims. (Cl. 286—30)

This invention relates to a sealing assembly and particularly to a sealing assembly which provides effective sealing over a wide range of temperature variations.

In many pneumatic and hydraulic systems it is necessary to provide sealing means to prevent fluid communication between separate regions of the system. A suitable sealing means must provide effective repetitive sealing over an entire range of operating conditions. The increasingly rigorous operating conditions to which systems are subjected in the course of technological advances include widely-divergent extremes of temperature, high pressure differentials, and corrosive chemical environments. Pneumatic and hydraulic systems employed in aircraft and missiles provide illustrations of systems in which all of these operating conditions are frequently encountered.

The chemical inertness and overall temperature resistance of certain organic thermoplastic materials such as polytetrafluoroethylene, polytrifluorochloroethylene and certain of the polyamides make these materials better suited for use as sealing means under severe operating conditions than more resilient materials such as natural rubbers and certain other synthetic rubbers. However, where widely-divergent extremes of temperature are encountered, such as a range from —300° F. to 300° F., the sealing effectiveness of these materials in the conventional sealing arrangements hitherto employed is seriously impaired. This is because the coefficients of thermal expansion for these materials are significantly different from the coefficients of thermal expansion of the materials normally used to construct the operative elements of a system. For example, the coefficient of thermal expansion for polytetrafluoroethylene is approximately ten times greater than that for a typical stainless steel. Therefore, while the use of such a material in a conventional sealing arrangement provides effiective sealing at substantially constant temperatures, the sealing effectiveness of the material is substantially destroyed over part of a varying temperature range. This is because the contraction of the sealing material with decreasing temperatures is far greater than that of the material forming the contiguous operative elements so that the required sealing engagement present at certain temperatures is lost at other temperatures.

An added problem of sealing is introduced in systems where one element is movable with respect to another, such as a piston in a cylinder. In such a system the sealing means must be slidable so that it is continuously maintained in contact with both the moving element and the non-moving element. In order to reduce operating friction to the maximum possible extent, the sliding contact area of the sealing means in such a system must be maintained at a minimum value. This requirement makes the problem of maintaining effective sealing over a wide range of temperature variations particularly difficult.

The present invention provides a sealing assembly whereby effective sealing is achieved under a wide range of operating temperatures while the advantages inherent in the utilization of inert organic plastic materials are realized. The present invention is a sealing assembly comprising a sealing means shaped to contact at its periphery each of the cooperating contiguous surfaces formed within a structure. Resilient spring means act to urge the sealing means in sealing engagement against each of the contiguous surfaces. The sealing means are adapted whereby the force exerted by the spring means is resolved into separate force components. Each force component acts to press a portion of the sealing means against a separate surface of the structure.

While the seal assembly according to the invention may be advantageously utilized to provide sealing between two non-moving elements in a system, it is particularly effective as applied to the difficult problem of providing effective sealing where one element is movable with respect to another element in systems subjected to a wide rang of temperature variations. Therefore, while not so limited, it is described with respect to such a system to illustrate the concept of the invention.

In a structure having a slidable element such as a piston within a passage or cylinder, a seal must frequently be provided to isolate the region adjoining one end of the slidable element from the region adjoining the other end of the slidable element. The sealing means must be slidable so that it can be continually maintained in sealing engagement both with a surface of the slidable element and the surface of the cylinder. In such an embodiment of the sealing assembly according to the invention, spring means are disposed to exert a force against the sealing means and to maintain it in sealing engagement during oscillating movements of the slidable element. The force exerted by the spring is resolved into separate force components within the sealing means. One force component acts to press the sealing means against a surface of the slidable element while another force component acts to press the sealing means against the surface of the cylinder. The force exerted by the spring is adjusted so that it is sufficiently great to maintain the sealing means in sealing engagement with both surfaces at low temperatures when the tendency of the sealing material is to contract. However, the force exerted by the spring is also adjusted so that it does not exceed the elastic limit of the sealing means at elevated temperatures. Consequently no extrusion of the plastic material into the small anulus formed between the slidable element and the cylinder occurs.

The utility of the seal assembly according to the invention is further enhanced by shaping the sealing means so that a small sliding contact area is provided. In this manner the sliding friction of the system is reduced to a minimum. In addition, the portion of the sealing means adjacent to the surface of the cylinder is relieved to prevent extrusion of the plastic material into the small anulus between the piston and the cylinder under the influence of elevated temperatures and pressure.

It is readily apparent that the sealing assembly according to the concept of the present invention may be advantageously adapted for use in a wide number of systems. It may be utilized in pressure relief valves employed in such systems as the pneumatic or hydraulic systems of aircraft or missiles. It may also be used in proportionating or metering pumps subjected to either wide variations in ambient temperature or to alternate dispensations of hot and cold fluids. It is further apparent that the seal assembly may be used in a wide variety of other fluid displacement systems. In systems employing movable elements, the sealing assembly according to the invention may be used either with plunger-type systems or piston-type systems. A plunger-type system refers to one in which the sealing means is maintained stationary with respect to a movable element. A piston-type system refers to one in which the sealing means moves with the movable element. The concept according to the invention may also be made adaptable to both short-stroke and long-stroke systems by appropriate modifications.

The sealing assembly of this invention will be more readily understood and its advantages better appreciated from the following description made in conjunction with the accompanying drawings in which.

Figure 1:
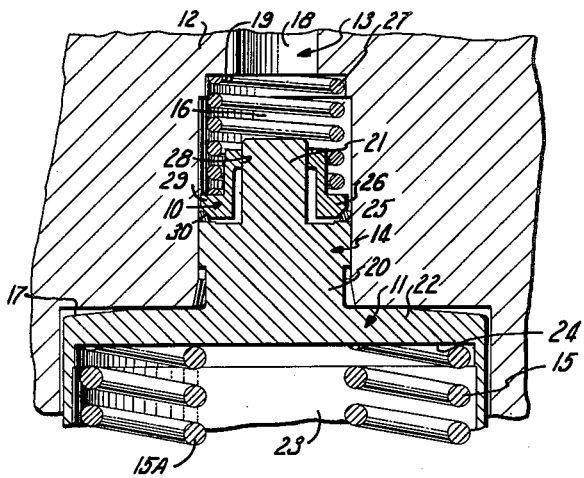
FIG. 1 is a fragmentary sectional elevation of one embodiment of the sealing assembly according to the invention as used in an application such as a pressure relief valve.

With reference to FIG. 1, an embodiment of the sealing assembly of the present invention, generally shown by 10, is shown as used in an application such as a pressure relief valve, generally shown by 11. While all elements of the pressure relief valve are not shown, the elements of the pressure relief valve operative with the sealing assembly are a housing 12 defining a flow passage 13 of circular cross section, a flow-control piston 14 within the flow passage and piston springs 15 and 15A acting against one side of the flow-control piston.

The flow passage comprises three sections of differing diameters, namely, an intermediate section 16 opening on one end into a large section 17 of greater diameter and opening on the other end into a small section 18 of reduced diameter. A shoulder 19 is formed in the housing where the intermediate section of the flow passage opens into the small section.

The flow-control piston comprises three integrally formed portions of differing diameters, designated for convenience as a ring portion 20 joined on one end to a shaft portion 21 and on the other end to a spring portion 22. The ring portion of the piston is slidably fitted within the intermediate section of the flow passage. The shaft portion, having a diameter substantially less than the ring portion, is also located within the intermediate section of the flow passage. The spring portion of the piston is fitted within the large section of the flow passage and has an outside diameter only slightly less than the diameter of the large section. The spring section has formed within it a recess 23 to provide a flat surface 24 on its underside. The piston springs are compression springs fitted between the flat surface of the piston spring portion and a surface of the housing (not shown) to exert a force urging the flow-control piston upwardly as the drawing is set out.

In the operation of the pressure relief valve, fluid pressure acts against the upper surfaces of the ring portion and shaft portion of the flow-control piston, thereby urging the piston downwardly as the drawing is set out. The piston springs are selected to provide an opposing force which maintains the piston in the position shown in the drawing until some predetermined fluid pressure is exceeded. When such predetermined fluid pressure is exceeded, a downward movement of the piston permits venting of the fluid through an exhaust (not shown) until the fluid pressure is again restored to the predetermined level.

From the above description, it is apparent that sealing means are required to prevent passage of fluid through the annulus formed between the ring portion of the piston and the contiguous wall of the intermediate section of the flow passage. Furthermore, the sealing means must be retained in sealing engagement during movement of the piston since the piston is subject to oscillating movements responsive to variations in fluid pressure below the predetermined pressure level at which the fluid is vented.

The embodiment of the sealing assembly of the present invention shown in FIG. 1 comprises a sealing ring 25, a seal retainer 26 and retaining spring 27.

The sealing ring is formed from a material having some resilient characteristic. However, the sealing assembly of the invention permits use of materials having considerably less resiliency than materials such as natural rubber and certain synthetic rubbers. Because of their inertness to chemical environments and overall resistance to high pressures and temperatures, organic thermoplastic materials such as polytetrafluoroethylene, polytrifluorochloroethylene and certain of the polyamides are preferred for use as materials for the sealing ring. Where the operating temperature range includes low temperatures, the use of polytetrafluoroethylene is preferred for construction of the sealing ring. Where the operating temperature range includes high temperatures, the use of certain polyamides is preferred as the construction material. Metallic materials having comparable structural characteristics when subjected to similar physical conditions or chemical environments may also be used.

The sealing ring is shaped in the form of a circular ring having an outside diameter substantially equal to the diameter of the intermediate section of the flow passage. The cross section of the sealing ring may best be described as a square with wedges in the form of 45° triangles removed from a pair of diagonally-opposite corners. The sealing ring is placed on a horizontal surface of the ring portion of the piston so that one side of the sealing ring contacts the surface of the flow passage and an adjacent side of the sealing ring contacts the horizontal surface of the piston. One truncated corner is between these contacting sides of the sealing ring. The relief provided by this truncated corner serves to insure that no extrusion of the plastic occurs into the small annulus formed between the flow passage surface and the ring portion of the piston when the sealing ring is subjected to high temperatures and pressures.

In this embodiment of the sealing assembly, the seal retainer is in the form of a hollow cylinder extending coaxially on the outside of the shaft portion of the piston. A bore 28 in the top surface of the retainer is loosely fitted to the diameter of the shaft portion of the piston and a skirt 29 extends horizontally and outwardly from the bottom of the cylinder. The skirt is substantially rectangular in cross section with a truncated bottom outer edge 30. The truncated portion of the skirt is inclined to coincide with the other truncated portion of the sealing ring.

The retaining spring is a helical spring fitted under compression between the top flat surface of the skirt of the seal retainer and shoulder 19 formed in the housing. The force exerted by the retaining spring is axial with respect to the piston and is exerted normal with respect to the top flat surface of the skirt. This force is transmitted through the seal retainer to the inclined mating surface of the sealing ring and is exerted normal to this surface. The force is resolved into equal rectangular force components within the sealing ring where, as in this embodiment, the cross section of the sealing ring is such that the linear distance from any given point on the inclined surface of the sealing ring to the surfaces of the flow passage and the piston, respectively, is the same. As a result, a radial force component acts to press one side of the sealing ring against the surface of the flow passage and an equal axial force component acts to press another side of the sealing ring against the top surface of the piston. In this manner, the sealing ring is pressed into sealing engagement with both the surface of the flow passage and a surface of the piston.

The retaining spring is selected so that its force is sufficiently great to maintain the sealing ring in sealing engagement under all operating conditions. Therefore, even at low temperatures within the operating temperature range, the sealing ring is maintained in sealing engagement by the retaining spring despite the tendency of the plastic material to contract. Furthermore, the retaining spring is selected so that its force is not so great as to extrude the plastic into the annulus between the wall and the piston at high temperatures. While some deformation of the sealing ring necessarily occurs at high temperatures, extrusion into the annulus is also avoided by the relief provided by the truncated corner of the sealing ring.

The retaining spring is also adjusted so as to maintain the sealing ring in sealing engagement despite upward and downward oscillations of the piston due to variations in fluid pressure. These design characteristics of the retaining spring may be readily adapted for the particular system dependent upon the sealing ring material, the operating temperatures and pressures and the maximum length of the piston stroke. As a result, a slidable sealing means is provided which is maintained in continued sealing engagement during oscillations of the piston.

Consistent with the requirements for effective repetitive sealing, the cross-sectional area of the sealing ring in contact with the wall of the flow passage is kept to a minimum value to provide the least possible frictional resistance during movements of the piston and sealing ring. This requirement is also consistent with the design requirement that a minimum cross-sectional area be provided so that deformation sufficient for sealing purposes may be achieved at small spring loads.

Figure 2:
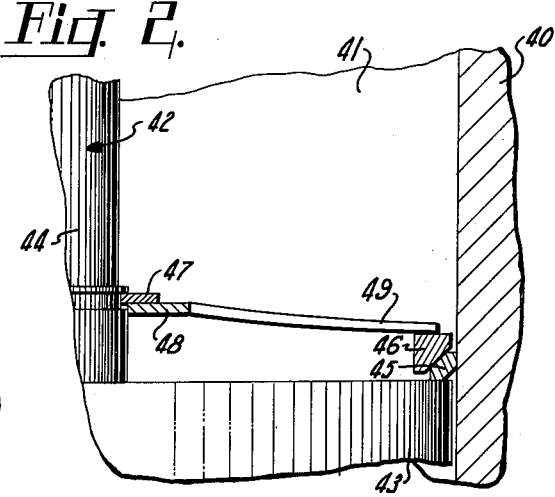
FIG. 2 is a fragmentary sectional elevation of another embodiment of the assembly.

With reference to FIG. 2, a fragmentary view of another embodiment of the sealing assembly according to the invention is shown. A housing 40 defines a flow passage 41 in which is disposed a piston 42 having a ring portion 43 slidably fitted within the flow passage. Integrally joined to the ring portion of the piston is a shaft portion 44 having a considerably smaller diameter than the ring portion of the piston. A sealing ring 45, generally identical in construction and shape to that described in conjunction with FIG. 1, is placed on the top flat surface of the ring portion of the piston so that one side of the ring is in contact with the top surface of the piston and an adjoining side is in contact with the contiguous surface of the flow passage. One truncated corner of the sealing ring is between these contacted surfaces. A seal retainer 46 is ring-shaped with a cross section best described as a square with a truncated bottom outer corner. The outside diameter of the retainer is slightly less than that of the sealing ring. The seal retainer is fitted in mating contact with the inner surface of the sealing ring so that its truncated corner presses against the other truncated corner of the sealing ring. A support piece 47 is a skirt-like projection rigidly joined to the periphery of the shaft portion of the piece. A spring sheet 48 is a ring-shaped member having an inner diameter fitted to the diameter of the shaft portion of the piston. The spring sheet is joined, as by welding, screws or other suitable means, to the support piece. A plurality of flat springs, of which one 49 is shown in FIG. 2, are formed as integral extensions of the spring sheet. In the embodiment herein described, four flat springs are equally spaced and disposed so that the free end of each bears against the top surface of the seal retainer. A force, axial with respect to the axis of the piston, is thereby exerted against the seal retainer. As described in conjunction with FIG. 1, this force, when transmitted to the sealing ring, is resolved into equal rectangular force components so that the contacting sides of the sealing ring are pressed in sealing engagement by axial and radial force components.

This embodiment of the invention is particularly suitable as a slidable seal assembly where a long stroke of a piston occurs. Since the flat springs are joined to the piston, the force exerted by these springs is constant throughout reciprocating movements of the piston. Considerations as to the spring constant of the spring material and the number of flat springs employed are identical to those discussed in conjunction with the helical spring described in FIG. 1.

Figure 3:
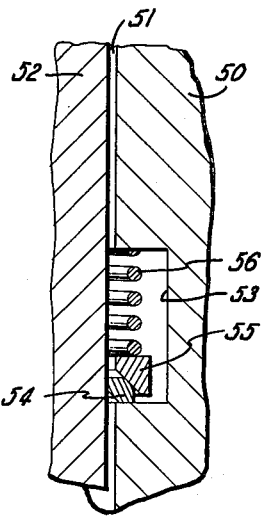
FIG. 3 is a fragmentary sectional elevation of yet another embodiment of the sealing assembly.

With reference to FIG. 3, a plunger-type embodiment of the sealing assembly according to the invention is shown. A housing 50 defines a flow passage 51 within which a piston 52 is slidably fitted. A recess 53, substantially rectangular in cross section, is formed in the housing to provide an annular ring opening into the flow passage. A sealing ring 54, identical in construction and shape to that described in conjunction with FIGS. 1 and 2, has an inside diameter substantially equal to the outside diameter of the piston. The ring is placed in the recess so that one side of the ring is pressed against the piston and another side is pressed against a wall of the recess adjoining the flow passage. A seal retainer 55, identical in shape to the one described in FIG. 2, has an outside diameter slightly greater than the outside diameter of the sealing ring. The seal retainer is fitted in mating contact with the outer surface of the sealing ring so that its truncated corner presses against the corresponding surface of the sealing ring. A helical retaining spring 56 is compressed between the seal retainer and a wall of the recess parallel to the one upon which the sealing ring is placed. The force exerted by the retaining spring is resolved into axial and radial force components within the sealing ring so that the sealing ring is maintained in sealing engagement with both the wall of the recess and the surface of the piston. The design characteristics of the elements of the sealing assembly are identical to those described in conjunction with FIGS. 1 and 2.

The embodiment described in FIG. 3 is particularly applicable for providing packing to systems such as piston shafts and the like where a long stroke occurs. In this embodiment, the sealing assembly itself does not move but is maintained in sealing engagement against a movable surface.

Figure 4:
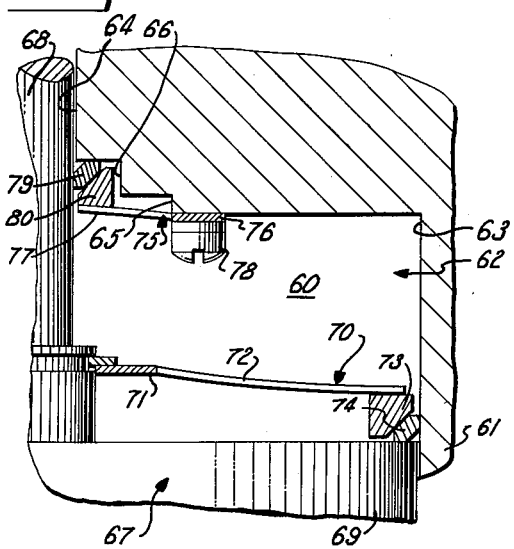
FIG. 4 is a fragmentary sectional elevation of the sealing assembly in an application combining two embodiments of the sealing assembly.

With reference to FIG. 4 two embodiments of the sealing assembly of the present invention are utilized in combination to seal off a pressure chamber 60 within a flow passage. A housing 61 defines a flow passage 62 having two sections of differing diameters, a large section 63 and a small section 64. The transition between the large section and the small section of the flow passage is step-like, being made by two recesses 65 and 66 of respectively decreasing intermedial diameters. A piston 67 comprises a shaft portion 68 slidably fitted in the small section of the flow passage and an integrally joined ring portion 69 slidably fitted in the large section.

A slidable sealing assembly 70, comprising a ring-shaped spring sheet 71, joined near its inner diameter to the shaft portion of the piston and a plurality of flat springs, of which one 72 is shown in FIG. 4, radially extending outwardly from the spring sheet to exert an axial force against a seal retainer 73 contacting a sealing ring 74, is identical to the embodiment described with reference to FIG. 2. The sealing ring slidably moves with reciprocating movements of the piston and is maintained in sealing engagement against both the surface of the large section of the flow passage and the top flat surface of the ring portion of the piston. In this manner, the pressure chamber is sealed from the region below the ring portion of the piston.

A stationary sealing assembly 75 comprises a ring-shaped spring sheet 76 from which a plurality of flat springs of which one 77 is shown in FIG. 4, extend inwardly. The ring sheet is joined as by screws, of which one 78 is shown in FIG. 4, to a wall defining the pressure chamber. A sealing ring 79 is fitted within recess 66 so that one side of the sealing ring contacts the shaft portion of the piston and an adjoining side contacts a wall defining the recess. A seal retainer 80 is urged against the sealing ring by the flat springs. The mating relationship of the seal retainer and sealing ring, as well as the construction and shape of each, are the same as described with refernce to FIGS. 2 and 3. Although stationary, the sealing assembly seals the pressure chamber from the region above the point where the sealing ring contacts the shaft portion of the piston.

The embodiments of the sealing assembly according to the invention described are illustrative of the concept of the invention and in no way exhaust the number of embodiments which are within the scope of the invention. For example, while a seal retainer offers the most convenient method of transmitting the force from a retaining spring to a sealing ring, it is possible to adapt the position of the retaining spring and the shape of the sealing ring so that the force of the spring is directly applied to the sealing ring and therein resolved into separate force components. Various modifications may be made in the type and structure of the retaining spring as well as the relationship in which it is positioned relative to the seal retainer. Similarly the shapes of the sealing ring and the seal retainer and the inclination of their mating surfaces may be modified within the concept of the invention so that other than equal rectangular force components are transmitted within the sealing ring.

It is readily apparent from the embodiments previously described that the concept of the sealing assembly according to the present invention may be adapted to a wide number of varying uses. In addition to its primary advantage of providing a sealing means effective throughout widely divergent temperature variations, it permits consistent sealing effectiveness in systems subjected to destructive chemical environments.

I claim:

1. In a structure having a surface defining a cylindrical flow passage within which a cylindrical piston is slidably fitted, a sealing assembly for providing a slidable seal comprising a sealing ring having a substantially rectangular cross section with a pair of truncated diagonally-opposite corners and an outside diameter substantially equal to the diameter of the passage, the sealing ring being positioned on a flat surface of the piston so that one truncated corner is disposed between one portion of the ring surface contacting the flat surface of the piston and an adjacent portion of the ring surface contacting a contiguous surface of the passage; a ring-shaped seal retainer having an inclined surface, a portion of said inclined surface disposed to mate circumferentially with the entire other truncated corner of the sealing ring; and spring means disposed to exert a unidirectional force against the seal retainer to urge the retainer against the sealing ring, the mating surfaces of the retainer and the sealing ring being adapted whereby the unidirectional force exerted by the spring means against the retainer is resolved within the sealing ring into separate rectangular force components acting to press the separate portions of the sealing ring in sealing engagement against the contacted surfaces of the piston and passage respectively.

2. Sealing assembly in accordance with claim 1 wherein the sealing ring is formed from an organic thermoplastic material.

3. Sealing assembly in accordance with claim 1 wherein the sealing ring is formed from polytetrafluoroethylene.

4. In a structure having a housing defining a cylindrical flow passage and a cylindrical piston, the piston including a ring portion slidably fitted in the flow passage and a shaft portion of reduced diameter, a sealing assembly for providing a slidable seal comprising a sealing ring having a substantially rectangular cross section with a pair of truncated diagonally-opposite corners and an outside diameter substantially equal to the diameter of the passage, the sealing ring being positioned on a flat surface of the ring portion of the piston so that one truncated corner is disposed between one portion of the ring surface contacting the flat surface of the piston and an adjacent portion of the ring surface contacting a contiguous surface of the passage; a ring-shaped seal retainer having an inclined surface, a portion of said inclined surface disposed to mate circumferentially with the entire other truncated corner of the sealing ring; and a plurality of flat springs rigidly joined on one end to the shaft portion of the piston and disposed to exert a force against the retainer to urge the retainer against the sealing ring, the mating surfaces of the retainer and the sealing ring being adapted whereby the force exerted by the spring means is resolved into separate rectangular force components acting to press the separate portions of the sealing ring in sealing engagement against the contacted surfaces of the piston and passage respectively.

5. In a structure having a housing defining a cylindrical flow passage, a cylindrical piston slidably fitted in the flow passage for reciprocating movement therein, and a recess formed in the housing to peripherally adjoin the flow passage, a sealing assembly comprising a sealing ring having a substantially rectangular cross section with a pair of truncated diagonally-opposite corners and an inside diameter substantially equal to the diameter of the flow passage, the sealing ring being fitted on a flat surface in the recess so that one truncated corner is disposed between one portion of ring surface contacting the flat surface of the recess and an adjacent portion of the ring surface contacting a contiguous surface of the piston; a ring-shaped seal retainer having an inclined surface, a portion of said inclined surface disposed to mate circumferentially with the entire other truncated corner of the sealing ring; and spring means disposed in the recess to urge the retainer against the sealing ring, the mating surfaces of the retainer and the sealing ring being adapted whereby the force exerted by the spring means is resolved into separate rectangular force components acting to press the separate portions of the sealing ring in sealing engagement against the contacted surfaces of the recess and piston respectively.

6. Sealing assembly in accordance with claim 5 wherein the spring means are a plurality of flat springs, each rigidly joined at one end to a surface of the recess and disposed at the other end to exert an axial force upon the seal retainer.

7. In a structure having a surface defining a passage within which is fitted a slidable element, a sealing assembly comprising a sealing ring having a substantially rectangular cross section including an inclined surface and diagonally-opposite truncated corners, the sealing ring being positioned so that the truncated corner is disposed between portions of the periphery of the sealing ring contacting separately a surface of the slidable element and a contiguous surface of the passage, retaining means including a surface inclined correspondingly to the inclined surface of the sealing ring and disposed so that a portion of it mates with the entire correspondingly inclined surface of the sealing ring and spring means disposed to exert a unidirectional force axial with respect to the passage against the retaining means to urge the retaining means against the sealing ring, the respective inclined surfaces of the sealing ring and the retaining means being adapted whereby the unidirectional force exerted by the spring means is resolved within the sealing ring into an axial first force component and a radial second force component acting through the sealing rings to press the separate portions of the sealing ring in sealing engagement against the surfaces of the slidable element and the passage, respectively.

References Cited in the file of this patent

UNITED STATES PATENTS

| 410,127 | Sullivan | Aug. 27, 1889 |
| 464,711 | Jerome | Dec. 8, 1891 |
| 1,211,061 | Bock | Jan. 2, 1917 |
| 1,360,593 | Smith | Nov. 30, 1920 |
| 1,841,050 | O'Stroske | Jan. 12, 1932 |
| 2,020,122 | Padgett | Nov. 5, 1935 |
| 2,276,406 | Magrum | Mar. 17, 1942 |
| 2,660,459 | Collins | Nov. 24, 1953 |
| 2,789,847 | Jackson | Apr. 23, 1957 |
| 2,827,314 | Granberg et al. | Mar. 18, 1958 |

FOREIGN PATENTS

| 10,836 | Great Britain | of 1906 |
| 1,102,582 | France | May 11, 1955 |

UNITED STATES PATENT OFFICE
CERTIFICATE OF CORRECTION

Patent No. 2,993,713

July 25, 1961

Rudolph E. Krueger

It is hereby certified that error appears in the above numbered patent requiring correction and that the said Letters Patent should read as corrected below.

Column 8, line 37, after "and" insert -- a --; line 38, for "corners" read -- corner --.

Signed and sealed this 2nd day of January 1962.

(SEAL)
Attest:

ERNEST W. SWIDER
Attesting Officer

DAVID L. LADD
Commissioner of Patents

USCOMM-DC